US010180360B1

(12) United States Patent
Naranjo et al.

(10) Patent No.: US 10,180,360 B1
(45) Date of Patent: Jan. 15, 2019

(54) DISTRIBUTED TEMPERATURE SENSOR PROBE

(71) Applicants: Ramon Carlos Naranjo, Reno, NV (US); Robert Turcotte, Mont-St-Hilaire (CA)

(72) Inventors: Ramon Carlos Naranjo, Reno, NV (US); Robert Turcotte, Mont-St-Hilaire (CA)

(73) Assignee: The United States of America as Represented by the Secretary of the Department of the Interior, Washington, DC (US)

( * ) Notice: Subject to any disclaimer, the term of this patent is extended or adjusted under 35 U.S.C. 154(b) by 323 days.

(21) Appl. No.: 14/987,488

(22) Filed: Jan. 4, 2016

Related U.S. Application Data

(60) Provisional application No. 62/100,365, filed on Jan. 6, 2015.

(51) Int. Cl.
*G01K 1/08* (2006.01)
(52) U.S. Cl.
CPC ...................................... *G01K 1/08* (2013.01)
(58) Field of Classification Search
None
See application file for complete search history.

(56) References Cited

U.S. PATENT DOCUMENTS

| 6,836,220 | B2 * | 12/2004 | Brown | G01K 1/026 340/870.37 |
|---|---|---|---|---|
| 8,109,670 | B2 * | 2/2012 | Al-Misfer | G01F 23/22 136/200 |
| 9,316,543 | B2 * | 4/2016 | Bronczyk | G01D 21/00 |
| 2008/0043809 | A1 * | 2/2008 | Herbert | G01K 1/026 374/163 |
| 2013/0038471 | A1 * | 2/2013 | Harless | G01K 1/024 340/870.17 |
| 2014/0208847 | A1 * | 7/2014 | Baranov | G01D 11/24 73/431 |

FOREIGN PATENT DOCUMENTS

KR    100773427 B1 * 11/2007

OTHER PUBLICATIONS

Bartolino, J. R., and R. Niswonger , Numerical simulations of vertical groundwater fluxes of the Rio Grande from ground-water temperature profiles, central New Mexico, U.S. Geol. Surv. Water Resour. Invest. Rep., 1999, 4212, p. 1-34.

(Continued)

*Primary Examiner* — Natalie Huls
*Assistant Examiner* — Janice M Soto
(74) *Attorney, Agent, or Firm* — James M. Mitchell

(57) ABSTRACT

A distributed temperature sensor probe for measuring temperature at multiple depths. The probe includes a plurality of temperature sensors connected in series inside a sensor housing. The temperature sensors are distributed at various points along the length of the sensor housing. Each temperature sensor has an internal storage and an internal battery. A probe head is connected to a top of the sensor housing, and a probe tip is connected to a bottom of the sensor housing.

15 Claims, 4 Drawing Sheets

(56) References Cited

OTHER PUBLICATIONS

Eddy-Miller, C.A., Jim Constantz, J.D. Wheeler, R.R. Caldwell, and J.R.B. Barlow, Demonstrating usefulness of real-time monitoring at streambank wells coupled with active streamgages—Pilot studies in Wyoming, Montana, and Mississippi, U.S. Geological Survey Fact Sheet, 2012, 3054, p. 1-14.

Hatch, C. E., A. T. Fisher, J. S. Revenaugh, J. Constantz, and C. Ruehl (2006), Quantifying surface water/ground water interactions using time series analysis of streambed thermal records: Method development, Water Resour. Res., 2006, 42, W10410, doi:10.1029/2005WR004787, p. 1-6.

Stonestrom, D.A. and K.W Blasch, Determining temperature and thermal properties for heat-based studies of surface-water groundwater interactions, In heat as a tool for studying the movement of ground water near streams, U.S. Geological Survey Circular No. 1260, 2003, Appendix A.

\* cited by examiner

DISTRIBUTED TEMPERATURE SENSOR PROBE

CROSS-REFERENCE TO RELATED APPLICATION(S)

This application is related to and claims the benefit of priority to U.S. Provisional Application Ser. No. 62/100,365 filed Jan. 6, 2015 in the U.S. Patent and Trademark Office, the contents of which are incorporated herein by reference.

STATEMENT OF GOVERNMENT INTEREST

The invention described herein may be manufactured, used, and licensed by or for the U.S. Government for governmental purposes without payment of any royalties thereon.

BACKGROUND

The invention relates to devices for monitoring subsurface temperatures.

Agricultural diversions can result in significant uses of surface water. Estimating seepage has many practical challenges such as accuracy of inflow-outflow measurements due to non-steady flow conditions. The use of heat as a tracer to estimate seepage losses has been demonstrated in the literature, but the availability of distributed temperature probes is largely unavailable for this purpose.

Measuring temperature beneath streambeds has typically been performed using temperature sensors that are attached to a cable and hung inside a pipe such as a well or piezometer (Hatch et al., 2006). However, the exposed pipe driven into an active river or stream has a high risk of damage due to high velocities and debris (branches, algae, trash), and access to the data requires removal of the sensors, connection of each sensor to a portable computer, and then return of the sensors following data retrieval. This process disrupts the experiment and is prone to errors caused by shifting of sensors. Removal of erroneous temperature data that reflects the time the sensors were exposed to ambient air temperatures is necessary using this method.

Thermistor wires that are connected to a data logger have been used to measure sediment temperatures (Bartolino and Niswonger, 1999). Thermistor wires subjected to high stage or velocities are subject to damage from canal debris and such placements are often destroyed at high flow conditions. Further, this type of system requires the use of an external insulated housing to store the data logger, battery, and reference thermistor to correct field data due to reference-junction errors (Stonestrom and Blasch, 2003). The expense of the data logger due to batteries and required maintenance, and limited locations where this system can be deployed without damage prohibit wide applications of this approach.

Thus, an improved temperature probe is needed.

SUMMARY

A distributed temperature sensor probe is described herein to measure continuous temperature in soils and riverbed sediments at multiple depths for assessing hydrological processes and water quality monitoring, including estimating rate of seepage and direction of flow. The singular probe has multi-depth sensors for monitoring and accessing temperature data. Each sensor is independent and has a self-contained storage capability and battery, which prolongs usage of the probe.

The temperature probe can be placed in saturated or unsaturated soils or sediments to collect and store continuous temperature data from multiple depths along a profile and estimate fluid flux. The amplitude and phase lag of the thermal signal with depth can be used to estimate fluid flux numerically through inversion of hydraulic and thermal parameters or directly through the use of analytical equations that relate heat transport to fluid movement.

The temperature probe can be deployed for short term (days) and long term (years) periods in a variety of environments and conditions, such as cobble-bed or sand soil environments and beneath flowing water, to understand saturated and variably saturated fluid flow processes. All points of entry into the temperature probe are water tight to avoid damage to internal electronics. The temperature probe is sturdy, low-profile to avoid debris, and allows for variations in monitoring design and frequency.

Data retrieval occurs via a removable communication cable without the need to remove the probe for data retrieval. Alternately, W-Fi sensor or telemetry networks can be used to allow for data retrieval without having to visit the probe. Data can then be uploaded to secured websites for review and analysis.

In accordance with an embodiment of the invention, there is provided a distributed temperature sensor probe for measuring temperature at multiple depths. The probe includes a plurality of temperature sensors connected in series inside a sensor housing. The temperature sensors are distributed at various points along the length of the sensor housing. Each temperature sensor has an internal storage and an internal battery. A probe head is connected to a top of the sensor housing, and a probe tip is connected to a bottom of the sensor housing.

BRIEF DESCRIPTION OF THE DRAWINGS

Various aspects and advantages of the invention will become apparent from the following detailed description, taken in conjunction with the accompanying drawings. The drawings are not necessarily drawn to scale. In the drawings.

DETAILED DESCRIPTION OF THE PREFERRED EMBODIMENTS

Figure 1:
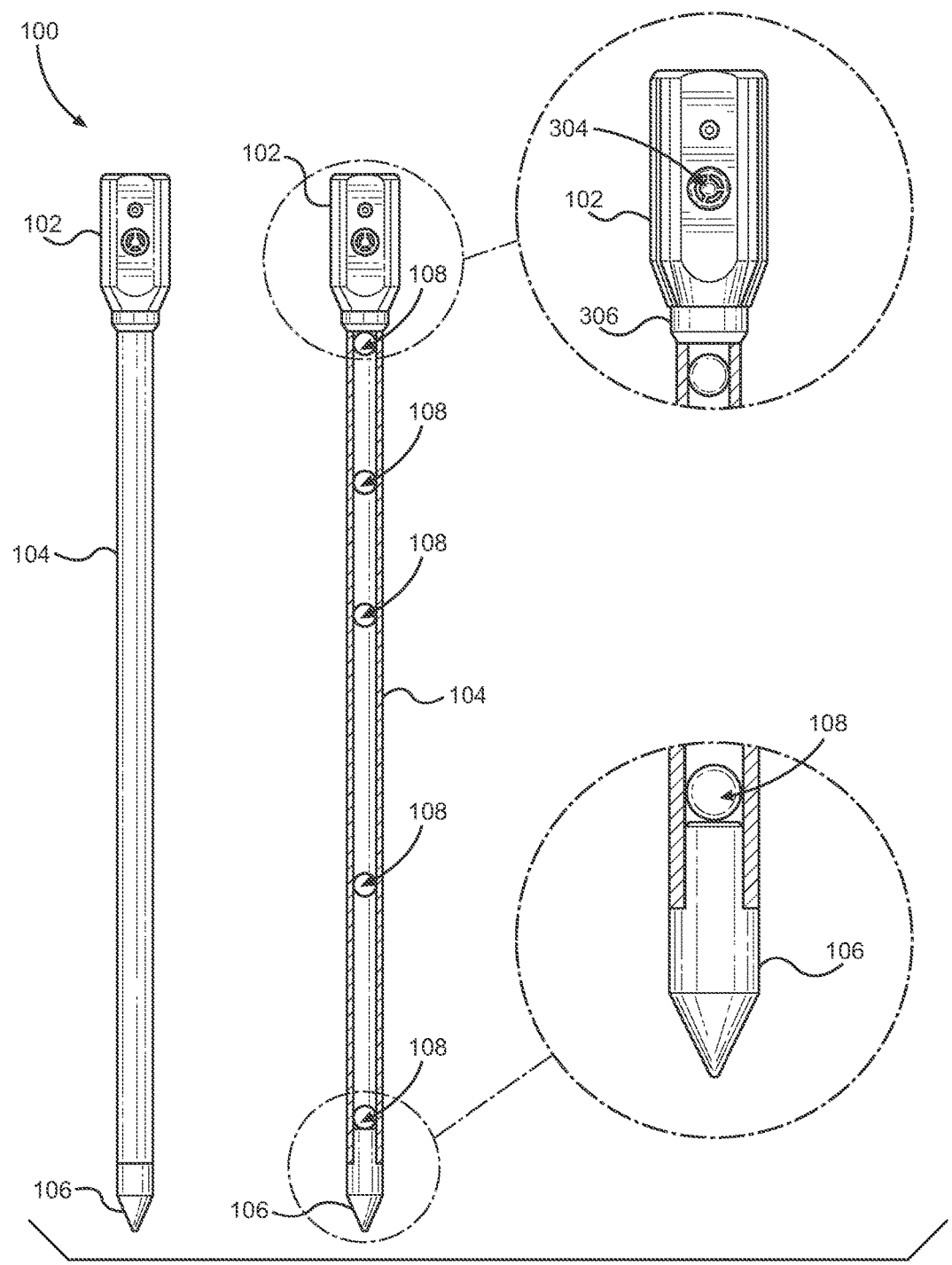
FIG. 1 illustrates a distributed temperature sensor probe, according to an embodiment of the invention.

The temperature probe described herein is used to measure continuous temperature in soils and riverbed sediments at multiple depths for estimating rate of seepage and direction of flow. The probe can be deployed for short term (days) and long term (years) periods in a variety of environments to understand saturated and variably saturated fluid flow processes. The self-contained data storage and batteries allow for data retrieval for long periods of time, without removing the instrument once installed, thus allowing for fixed depth monitoring.

Referring to FIGS. 1 to 5, a temperature probe 100 includes a probe head 102, a sensor housing 104, and a probe tip 106. In the embodiment shown in FIG. 1, the sensor housing 104 is a ¾-inch schedule 80 polyvinyl chloride (PVC) pipe that is used to measure temperatures up to a depth 1 meter. The schedule 80 PVC pipe is preferred, rather than a material such as, steel, for its strength and low thermal conductivity so that the housing 104 exerts minimal thermal influence on the response time of each temperature measurement. A material such as steel is not preferred because steel would cause heat to transport preferentially up and down the housing since the metal has higher thermal properties than soils and sediments. The probe head 102 and the probe tip 106 are made of solid PVC material.

The sensor housing 104 has multiple, autonomous temperature sensors 108 or temperature data loggers, each having an internal storage and an internal battery, that are connected in series inside the sensor housing 104. The embodiment shown in FIG. 1 includes five temperature sensors 108 such as iButton® sensors manufactured by Maxim Integrated of San Jose, Calif. For a 1 m length of pipe, up to about 10 sensors can be used. For the embodiment of the probe 100 shown in FIG. 1, the sensors 108 are spaced below the probe head 102 at intervals of about 0, 0.10, 0.20, 0.75 and 1.0 m distances beneath the probe head 102.

Foam baffles 109 are located within the sensor housing 104 between adjacent sensors 108 for thermal isolation of each sensor 108 located at different depths to prevent upward thermal movement of air transported from one depth to another, improving the precision of the temperature measurements and reducing the potential for error caused by heat conduction inside the sensor housing 104.

Each sensor 108 has an internal battery and records and stores temperature data autonomously inside its own RAM memory on a silicon chip. This improves the reliability of the temperature probe 100 and negates the need to use external batteries and microchips for data storage. Thus, any one of the sensors 108 can fail due to a faulty battery while the other sensors 108 continue to provide data. This also decreases the fabrication cost of the temperature probe 100 since an independent data logging system with separate battery and data storage is not required.

Figure 2:
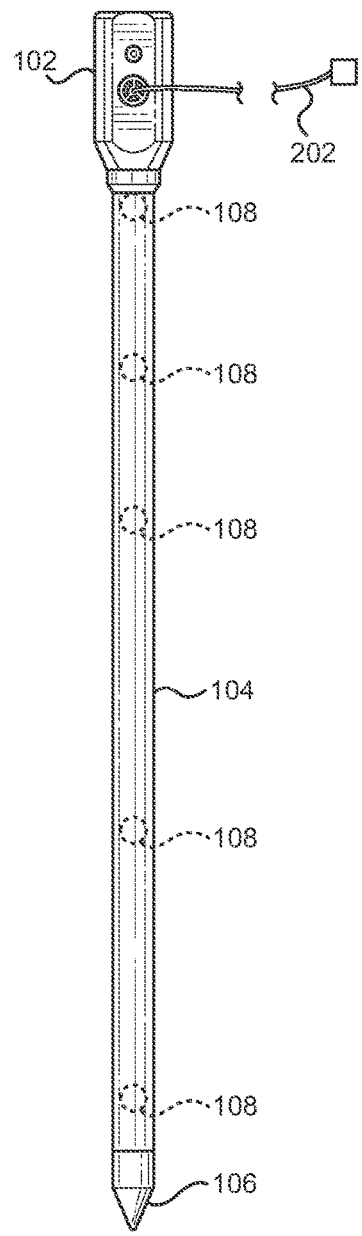
FIG. 2 is a front view of the distributed temperature sensor probe of FIG. 1, illustrating a communication cable attached to a probe head of the distributed temperature sensor probe.
Figure 5:
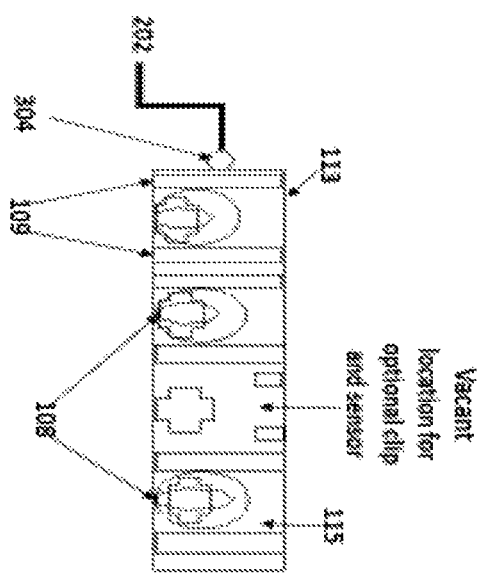
FIG. 5 illustrates a printed circuit board inside the sensor housing that connects the temperature sensors together and to the communication cable with the printed circuit board having chip holders.

Inside the sensor housing 104 is a rigid printed circuit board (PCB) 113 that connects the temperature sensors 108 together and to a communication cable 202, as shown in FIGS. 2 and 5. The PCB has clip holders that allow the sensors 108 to be "snapped" into place for easy removal and replacement. The sensors 108 are assembled or snapped into place on the PCB and then inserted inside the housing 104. This provides: (1) the ability to replace the sensors 108 without needing any rewiring or soldering; (2) the ability to add new sensors 108 at other depth intervals; and (3) eliminates the possibility of losing connection during field installation because once the sensors 108 are snapped into place, they do not become dislodged. The sensors 108 remain at fixed locations and will not shift or move.

No apertures in the housing 104 are required, so there is no risk of leaking, and causing damage to the electronics. No external batteries, wires, or adhesives are required. The transfer of heat through the sensor housing 104 is directly measured by the internal sensors 108, improving the reliability of the temperature probe 100 by eliminating any need the wires between the sensors 108. A thermal transfer compound 115 (e.g., a thermal conductive paste) is located between each sensor 108 and corresponding holding clip to reduce the temperature response time (thermal time constant). The response time is critical for temperature monitoring. The thermal transfer compound improves the temperature response time between the wall of the sensor housing 104 and the temperature sensors 108.

Each temperature sensor 108 is independent and self-contained, and can be easily replaced at the end of battery life. The ability to easily and quickly replace the sensors 108 avoids problems associated with catastrophic failure, or a slow failure with issues such as time delay and drift during long-term deployments.

Figure 3:
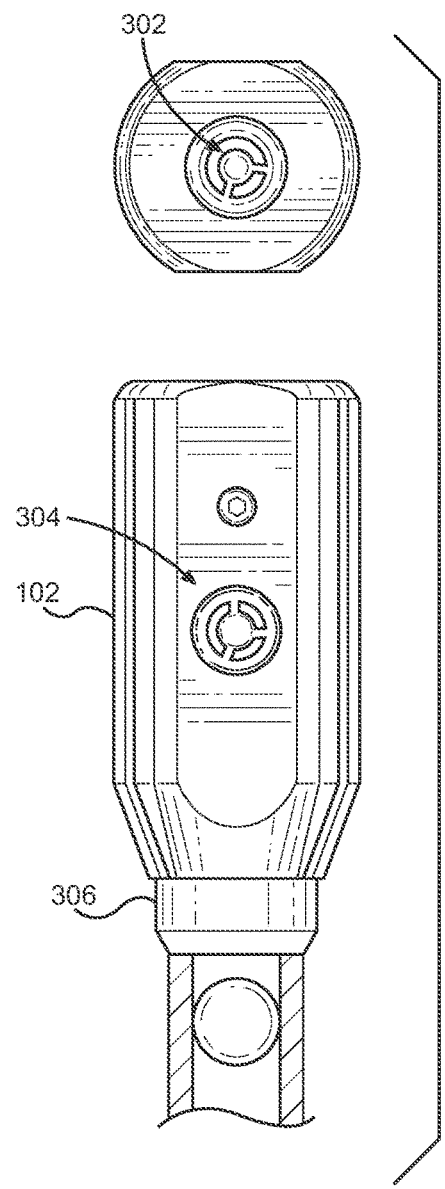
FIG. 3 illustrates contact points on the probe head of the distributed temperature sensor probe to connect the communication cable.

The data are retrieved via the water-resistant communication cable 202 that is connected to the probe head 102. The probe head 102 has a diameter of about 4 inches and has two contact points 302 and 304 to connect the communication cable 202 for downloading data, as shown in FIG. 3. These contact points 302 and 304 are water tight to avoid egress of water. The communication cable 202 is not connected to the probe 100 until the data are to be downloaded, providing a "cableless" probe 100 that decreases the risk of damage and makes the temperature probe 100 less obvious to the public, which minimizes theft, tampering, and damage.

The entire probe 100 and points where the communication cable 202 enters are sealed to prevent water egress that would damage the electronics inside the temperature sensors 108. The probe head 102 is low profile to avoid damage resulting from surface flow and floating debris, and is less conspicuous to the public to prevent tampering and vandalism.

The submersible communication cable 202 (submersible up to about 25 feet) can be connected to the probe head 102 underwater to transmit data from the sensors 108. The end connector on the probe head 102 can be left submerged in the water without failure. This allows the probe 100 to be left in submerged environments with or without the cable 202 for long-term periods, and the probe 100 can be accessed underwater to retrieve data without removal of the probe 100. The probe 100 also operates for longer periods submerged without the need for removal to replace batteries at the probe head 102.

Alternately, the temperature probe 100 can be coupled to a data storage device for long term data storage and W-Fi transmittal of data in remote monitoring situations that allows for data retrieval without having to visit the probe 100. Data can then be uploaded to secured websites for review and analysis.

The temperature range for the temperature probe 100 is sensor dependent. For the iButton® sensors made by Maxim Integrated, three types of iButton® sensors are available: (1) Type G (DS19221G), (2) Type Z (DS19221Z), and (3) Type L (DS1922L). For the Type G iButton® sensors, the range is $-40$ to $85°$ C., precision$+-1.0°$ C. and resolution$+-0.5°$ C. For type Z iButton® sensors, the range is $-5.0$ to $26°$ C., precision$+-1.0°$ C. and resolution$+-0.125°$ C. For type L iButton® sensors, the range is $-40.0$ to $85°$ C., precision$+-0.5°$ C. and resolution$+-0.0625°$ C. The storage for the Type G and Type Z iButton® sensors is 2048 data values and for the Type L is 4096 at the precision of $0.0625°$ C. or 8192 data values at precision of $0.5°$ C.

A borehole or well is not needed for installation of the probe 100. Rather, the temperature probe 100 is installed by direct, forceful hammering on the top of the probe head 102 to push the probe 100 into the ground or beneath the water surface. To facilitate driving the probe 100 into the ground, the sensor housing 104 is constructed as a continuous monolithic tube rather than having a plurality of physically interconnected modules. The sensor housing 104 is completely sealed at each end, minimizing the potential egress of water and potential damage to sensors 108 while increasing the strength of the probe 100.

The probe head 102 has a reinforcement part 306 made of additional PVC tubing at its base for stability and strength that is about 1-inch in diameter. The reinforcement part 306 reinforces and strengthens the area under the probe head 102 to prevent breakage when driving the probe 100 into the ground. The thickness of the sensor housing 104 and placement of the reinforcement part 306 at the base of the probe head 102 reduce the temperature response time (thermal time constant) and optimize the strength and impact resistance of the probe 100. Thus, the probe 100 can be installed in a variety of subsurface materials ranging from silt to riverbeds with large cobbles and gravels.

The temperature probe 100 can be used at gaging stations where seepage or groundwater contributions to flow are in question (Eddy-Miller and others, 2012). The design of seepage sites near gaging stations can include a temperature measurement at the sediment-water. Including the temperature probe 100 into this design improves the observational density near the streambed and allows monitoring for seepage rates (gains and losses) as well as monitoring changes in scour or deposition. Including the temperature probe 100 into the gage networks monitoring site standardizes the collection of data resulting in a more technically defensible dataset. Additionally, the U.S. Government has many climate and agricultural stations where automated monitoring data is being collected for the purpose of investigating soil moisture, temperature, and evapotranspiration. The temperature probe 100 is useful in the collection of distributed temperature data to support recharge investigations in agricultural and arid desert environments.

The temperature probe 100 can be used in conjunction with stream gages, water quality monitoring stations, and weather monitoring stations to provide education and outreach opportunities and other pertinent information for agencies interested in collecting temperature data for hydrological and ecological investigations. For ecological purposes, the temperature probe 100 can be used to determine the exceedance of temperature beyond critical temperatures for aquatic ecosystems living in hyporheic zones. Hydrological uses of the temperature probe 100 include characterization of the interaction between surface water and groundwater systems, monitoring the effects of climate change on stream temperatures, evaluating the response of earlier snow melt on groundwater recharge, seepage investigations in agricultural canals, monitoring the effects of scour and deposition on seepage of surface water, monitoring the frequency and timing of runoff in ephemeral channels for the estimation of recharge, and monitoring hillslopes overland flow processes to streams.

The temperature probe 100 described herein has several advantages, including:

(a) The temperature probe 100 collects and stores continuous temperature data from multiple depths and can be used for short term or long term monitoring.

(b) The multiple-depth sensors 108 are autonomous with separate batteries and storage.

(c) Individual temperature sensors 108 can be replaced easily when battery life has been exhausted, thereby allowing for continual use of raw materials (e.g., the PVC housing 104, the circuit board, and the communication cable 202).

(d) The temperature probe 100, once deployed can remain in-place without having to be removed to gain access to the sensors 108 for data retrieval.

(e) The communication cable 202 for downloading the sensor data and the probe head connectors 302, 304 are water tight and can remain in submerged environments without damage to the sensors 108 or electronics.

(f) The materials used are of great strength and can be hammered with great force for installation into cobble bed environments or in harsh riverine environments.

Figure 4:
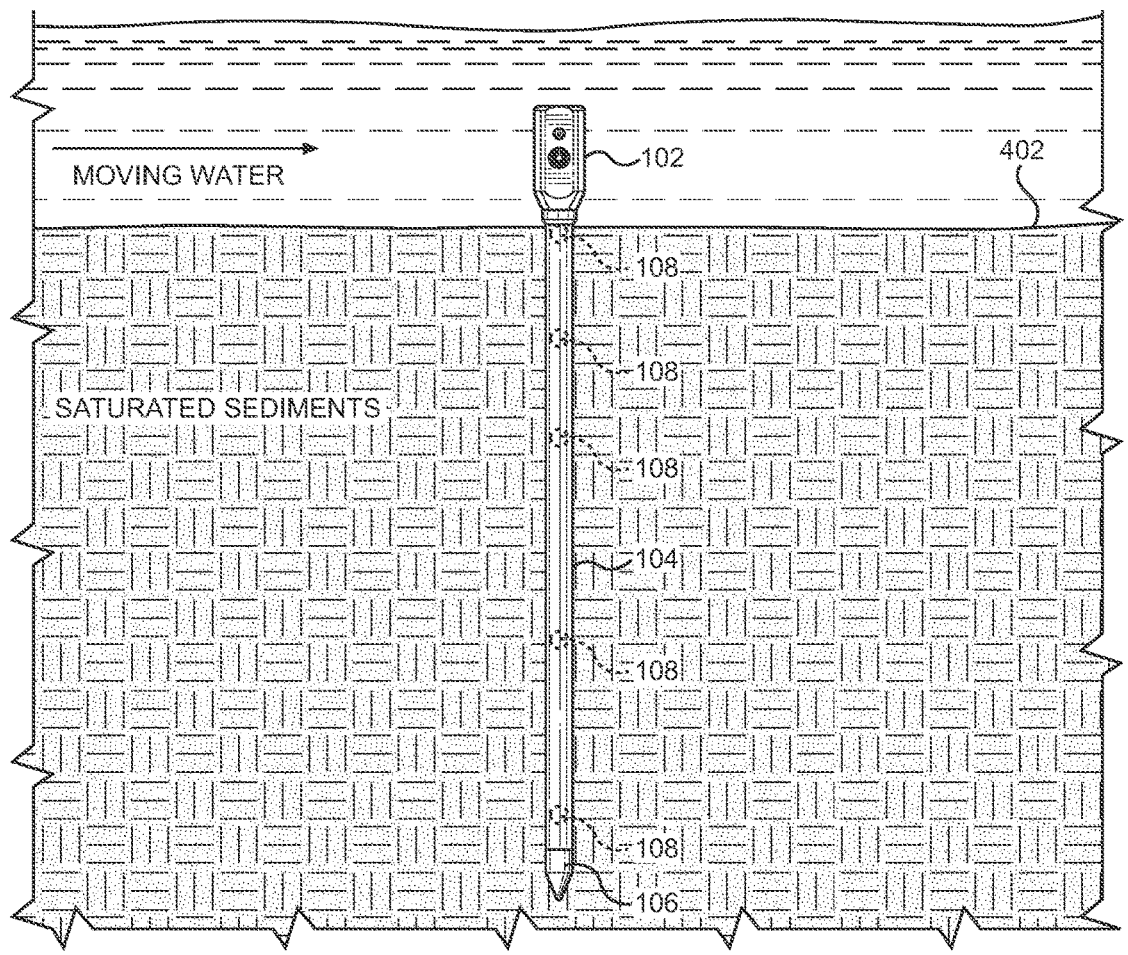
FIG. 4 illustrates the distributed temperature sensor probe deployed in water sediment.

(g) The temperature probe 100 is designed to be low-profile (i.e., the top of the probe, when deployed, is at the sediment-water interface 402, as shown in FIG. 4), not easily visible, and does not extend upward into the surface water, reducing the potential of damage caused by high velocity flows in surface water or floating debris. This allows placement in a variety of flow regimes and depth environments.

(h) All entry points of the temperature probe 100 are water proof for deployments in submerged environments.

It will be appreciated by those skilled in the art that modifications and variations of the present invention are possible without departing from the principles and spirit of the invention, the scope of which is defined in the appended claims and their equivalents.

GENERAL BIBLIOGRAPHY ON THE SUBJECT

The following bibliography provides citations to the references cited in the above text. The references are provided merely to clarify the description of the present invention and citation of a reference either in the bibliography below or in the specification above is not an admission that any such reference is "prior art" to the invention described herein.

Bartolino, J. R., and R. Niswonger (1999), Numerical simulations of vertical ground-water fluxes of the Rio Grande from ground-water temperature profiles, central New Mexico, U.S. Geol. Surv. Water Resour. Invest. Rep. 99-4212, 1-34.

Eddy-Miller, C. A., Constantz, Jim, Wheeler, J. D., Caldwell, R. R., and Barlow, J. R. B. (2012), Demonstrating usefulness of real-time monitoring at streambank wells coupled with active streamgages—Pilot studies in Wyoming, Montana, and Mississippi: U.S. Geological Survey Fact Sheet 2012-3054, 6 p.

Hatch, C. E., A. T. Fisher, J. S. Revenaugh, J. Constantz, and C. Ruehl (2006), Quantifying surface water/ground water interactions using time series analysis of streambed thermal records: Method development, Water Resour. Res., 42, W10410, doi: 10. 1029/2005WR004787.

Stonestrom, D. A. and K. W Blasch (2003), Appendix A, Determining temperature and thermal properties for heat-based studies of surface-water ground-water interactions, In heat as a tool for studying the movement of ground water near streams, edited by D. Stonetrom and J. Constantz. U.S. Geological Survey Circular 1260.

What is claimed is:

1. A distributed temperature sensor probe for measuring temperature at multiple depths, comprising: a sensor housing; a plurality of temperature sensors connected in series inside the sensor housing, the temperature sensors distributed at various points along a length of the sensor housing, and each temperature sensor having an internal storage and an internal battery configured to provide continuous data collection up to time of data retrieval; a printed circuit board inside the sensor housing that connects the temperature sensors together a probe head connected to a top of the sensor housing and said board; and a probe tip connected to a bottom of the sensor housing; wherein said sensors are mounted on said board.

2. The probe of claim 1, further comprising foam baffles located within the sensor housing between adjacent temperature sensors for thermal isolation of each temperature sensor.

3. The probe of claim 1, further comprising a communication cable attached to the Probe head.

4. The probe of claim 3, further comprising the printed circuit board having chip holders that allow the sensors to be snapped into place.

5. The probe of claim 1, wherein the probe head and the probe tip are connected to the sensor housing forming a water proof housing.

6. The probe of claim 5, wherein the sensor housing, the probe tip and probe head comprises polyvinyl chloride.

7. The probe of claim 6 configured with sufficient strength and thickness to be capable of being hammered into gravel and cobble bed.

8. The probe of claim 1, configured to be submerged for a period of days or years while being deployed at a monitoring site.

9. The probe of claim 1 further comprising a thermal transfer compound or paste formed over each said sensor.

10. The probe of claim 1 further including probe head configured to send and to receive data.

11. The probe of claim 10, capable of retrieving and sending data without removal of the probe from a monitoring site.

12. The probe of claim 1, further comprising a means for cableless data retrieval.

13. The probe of claim 12, further comprising the printed circuit board having chip holders that allow the sensors to be snapped into place.

14. A distributed temperature sensor probe for measuring temperature at multiple depths, comprising:
   a sensor housing;
   a plurality of temperature sensors connected in series inside the sensor housing, the temperature sensors distributed at various points along a length of the sensor housing, and each temperature sensor having an internal storage and an internal battery;
   a probe head connected to a top of the sensor housing; and
   a probe tip connected to a bottom of the sensor housing;
      foam baffles located within the sensor housing between adjacent temperature sensors for thermal isolation of each temperature sensor; whereby thermal transfer material is on said sensor between the foam baffles.

15. A distributed temperature sensor probe for measuring temperature at multiple depths, comprising: a sensor housing; a plurality of temperature sensors connected in series inside the sensor housing, the temperature sensors distributed at various points along a length of the sensor housing and each temperature sensor having an internal storage and an internal battery; a printed circuit board inside the sensor housing that connects the temperature sensor together; a probe head connected to a top of the sensor housing and a probe tip connected to a bottom of the sensor housing forming water proof probe; whereby the probe retrieves data and sends data for analysis without being removed from monitoring site; wherein said probe head is connected to said board; wherein said sensors are mounted on said board.

* * * * *